(12) United States Patent  (10) Patent No.: US 7,385,003 B1
Thoma et al.  (45) Date of Patent: Jun. 10, 2008

(54) IN-SITU FORMATION OF NANOPARTICLES WITHIN A SILICON-BASED MATRIX

(75) Inventors: Steven G. Thoma, Albuquerque, NM (US); Jess P. Wilcoxon, Albuquerque, NM (US); Billie L. Abrams, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 331 days.

(21) Appl. No.: 11/242,274

(22) Filed: Oct. 3, 2005

(51) Int. Cl.
 *C08F 220/12* (2006.01)
(52) U.S. Cl. ..................................... 524/858
(58) Field of Classification Search ................ 524/858
 See application file for complete search history.

(56) References Cited

U.S. PATENT DOCUMENTS

| | | | |
|---|---|---|---|
| 6,313,220 B1 * | 11/2001 | Materne et al. ............. | 524/863 |
| 6,359,034 B1 * | 3/2002 | Visel et al. ................. | 523/212 |
| 6,423,551 B1 * | 7/2002 | Weiss et al. ................ | 436/518 |
| 6,440,213 B1 * | 8/2002 | Alivisatos et al. ............ | 117/68 |
| 6,464,968 B2 | 10/2002 | Riffle et al. | |
| 6,548,168 B1 | 4/2003 | Mulvaney et al. | |
| 6,667,360 B1 | 12/2003 | Ng et al. | |
| 6,881,490 B2 | 4/2005 | Kambe et al. | |
| 7,068,898 B2 * | 6/2006 | Buretea et al. ............. | 385/123 |
| 2006/0207878 A1 * | 9/2006 | Myung et al. ......... | 204/403.09 |

OTHER PUBLICATIONS

Cumberland S. L. et al. Chem. Mater. 2002, 14, 1576-1584.*
Takada T. et al. Journal of Sol-Gel Science and Technology 1:123-132 (1994).*
Li C.-Y. et al. SPIE vol. 2288 Sol-Gel Optics III (1994) 151-162.*
Mackenzie J. D. Journal of Sol-Gel Science and Technology, 2, 81-86 (1994).*
Yamane M. et al. SPIE vol. 1758 Sol-Gel Optics II (1992) 577-586.*
Gerbec, J. A. J. Am. Chem. Soc. 2005, 127, 15791-15800.*
Bertino, M. F. Applied Physics Letters, 85(24), 6007-6009.*
Li, C.-Y. "Preparation and characterization of CdS quantum dot doped ORMOSILs" Ph. D. thesis, University of California at Los Angeles, 1993, p. 1-129.*
Wen et al. "Precipitation of Silica-Titania Mixed-Oxide Fillers into Poly(dimethylsiloxane) Networks", Rubber Chemistry and Technology, 1994, 67(5), 806-819.*
M. Rutnakornpituk et al, "Formation of cobalt nanoparticle dispersions in the presence of polysiloxane block copolymers" Polymer 43, 2002, pp. 2337-2348.
Celso de Mello Donega et al "Single-Step Synthesis to Control the Photoluminescence Quantum Yield and Size Dispersion of CdSe Nanocrystals", J. Phys. Chem B, (2003), vol. 107, No. 2, pp. 489-496.
Sander F. Wuister, et al "Synthesis and Luminescence of (3-mercaptopropyl)-trimethoxysilane capped CdS quantum dots", Journal of Luminescence, 2003, 102-103, pp. 338-343.

(Continued)

*Primary Examiner*—Randy Gulakowski
*Assistant Examiner*—Robert Loewe
(74) *Attorney, Agent, or Firm*—Carol I Ashby

(57) ABSTRACT

A method for encapsulating nanoparticles with an encapsulating matrix that minimizes aggregation and maintains favorable properties of the nanoparticles. The matrix comprises silicon-based network-forming compounds such as ormosils and polysiloxanes. The nanoparticles are synthesized from precursors directly within the silicon-based matrix.

21 Claims, 2 Drawing Sheets

OTHER PUBLICATIONS

C.L. Li et al, "Fabrication of highly luminescent glass incorporating CdTe nanocrystals by using silane coupling agents", Phys. Stat. Sol. (C) 0, (2003) No. 4, pp. 1250-1253.

D.L. Ou et al, "Structural studies of sol-gel processed, amine functionalized ormosils doped with phenyl-capped CdSe quantum dots," Phys. Chem. Glasses, 1998, 39,(3), pp. 154-166.

H. Schmidt, "Organically Modified Silicates by the Sol-Gel Process", Nat. Res. Soc. Symp. Proc. vol. 32 (1984) pp. 327-335.

Angela B. Seddon, et al, "CdSe Quantum Dot Doped Amine-Functionalized Ormosils", Journal of Sol-Gel Science and Technology 13, 1998, pp. 623-628.

* cited by examiner

Aminopropyltrimethoxysilane
(APTMS)

Aminopropyltriethoxysilane
(APTES)

[3-(2-aminoethylamino)propyl]trimethoxysilane

3-[2-(2-aminoethylamino)ethylamino]propyl-trimethoxysilane

IN-SITU FORMATION OF NANOPARTICLES WITHIN A SILICON-BASED MATRIX

The United States Government has rights in this invention pursuant to Department of Energy Contract No. DE-AC04-94AL85000 with Sandia Corporation.

BACKGROUND OF THE INVENTION

Inorganic nanoclusters dispersed in organic matrices are of importance to a number of emerging technologies. However, obtaining a set of desired properties with such organic-inorganic composites may require high concentrations of well-dispersed nanoclusters. Achieving high concentrations is possible when the chemistries of the particle surface and of the matrix are selected to produce a relatively low value of the interfacial free energy; an excess of interfacial free energy may cause phase separation and sometimes aggregation of nanoparticles. Thus, one type of system that achieves these energy characteristics is one in which the nanoclusters are stabilized by molecular species that are components of the encapsulating matrix or encapsulant. Since typical organic matrices are chosen as encapsulants for their bulk properties, they may not exhibit chemistries that provide low interfacial energies with nanoclusters. Also, the organic-inorganic interface can play a significant role in establishing and maintaining the desired nanocluster (and hence composite) properties, placing further constraints on desirable encapsulant/nanocluster combinations.

Ormosil is an acronym that stands for organically modified silicates. This term was initiated by Schmidt in the early 1980's to describe sol-gel materials comprised of an organoalkoxysilane, a Si—O inorganic backbone with pendant organic groups. A desirable feature of ormosils is their utility for creating organic-inorganic hybrid materials being standard sol-gel techniques. Ormosils can be formed from single monomeric precursors or mixtures of monomers. When ormosil compounds are derived from monomers (or mixtures of monomers) such that $R'_{4-x}Si(RO)_x$ where x is, on average between 3 and 4, polymerization leads to a 3-dimensional Si—O—Si network. The reactive alkoxy (RO) groups crosslink to form a 3-dimensional network and the final solid material contains properties imparted by the organic R' moiety. Thus, R' may be chosen to enhance chemical compatibility between particular nanoclusters and the reactive polymer matrix without interfering with the network forming R-groups, which largely determine the optical quality of the matrix. Other advantages of this family of materials are high condensation efficiencies and resulting low porosity.

Seddon and Ou (A. B. Seddon and D. L. Ou, "CdSe Quantum Dot Doped Amine-Functionalized Ormosils," J. Sol-Gel Sci. Technol. 13 (1998) p. 623-628) have isolated nanosized phenyl-capped CdSe particles (quantum dots) after preparation inside reversed micelles present in AOT/$H_2O$/heptane and redispersed them in amine-functionalized ormosils derived from 3-aminopropyl(trimethoxy)silane.

Mulvaney and Liz-Marzan (P. C. Mulvaney and L. M. Liz-Marzan, U.S. Pat. No. 6,548,168) claim a method for preparing a coated particle comprising admixing a source of a particle, a source of coating, and a bifunctional ligand and allowing the bifunctional ligand and coating to deposit on the particle.

Silicones are macromolecules comprised of a polymer backbone of Si and O with organic side groups attached to the Si atoms. Silicones are also termed polysiloxanes. Selection of suitable organic side groups can enable cross-linking to form a polymer network.

Kambe and coworkers (Kambe et al., U.S. Pat. No. 6,881,490) report inorganic particle/polymer composites that involve chemical bonding between the elements of the compound. The inorganic particles are formed prior to their reaction with the polymer to form the composite. In a first aspect, the invention of Kambe et al. pertains to a composite composition comprising a polymer having side groups, chemically-bonded to inorganic particles. In another aspect, the invention pertains to a composite composition comprising inorganic particles chemically bonded to a polymer through a linkage comprising a plurality of functional groups, the polymer selected from a group including polysiloxanes. The polymers posses functional side groups and/or terminal sites that can be chemically bonded with the inorganic particles, which generally are functionalized by bonding with a linker compound. In a further aspect, the invention of Kambe et al. pertains to a composite composition comprising a polymer chemically bonded to inorganic particles, wherein the inorganic particles comprise a metal. In addition, the invention pertains to a collection of metal/metalloid oxide or metal/metalloid nitride particles that are chemically bonded through a chemical linkage comprising an amine group, an amide group, a sulfide group, a disulfide group, an alkoxy group, a ester group, an acid anhydride group. The linkage is chemically bonded with a polymer. In other aspects, the invention pertains to a method for forming chemically bonded polymer inorganic particle composites. The method comprises binding side chain functional groups of polymer units to functional groups of a linker compound bonded to the inorganic particles.

In some embodiments of Kambe et al., the polymer incorporates the inorganic particles into the polymer network. This can be performed by reacting a functional group of the linker compound with terminal groups of a polymer molecule. Alternatively, the inorganic particles can be present during the polymerization process such that the functionalized inorganic particles are directly incorporated into the polymer structure as it is formed. In other embodiments, the inorganic particles are grafted onto the polymer by reacting the linker functional groups with functional groups on polymer side groups. The inorganic particles generally include metal or metalloid elements in their elemental form or in compounds. Specifically, the inorganic particles can include, for example, elemental metal or elemental metalloid, i.e. un-ionized elements, metal/metalloid oxides, metal/metalloid nitrides, metal/metalloid carbides, metal/metalloid sulfides or combinations thereof. Metalloids are elements that exhibit chemical properties intermediate between or inclusive of metals and nonmetals. Metalloid elements include silicon, boron, arsenic, antimony, and tellurium. Preferred particles have an average diameter of less than about 500 nanometers (nm). Suitable nanoparticles can be formed, for example, by flame synthesis, combustion, or sol gel approach. Preferred methods for synthesizing the particles include laser pyrolysis in which light from an intense focused source drives the reaction to form the particles. Laser pyrolysis is useful in the formation of particles that are highly uniform in composition, crystallinity and size. To form the desired composites, the inorganic particles are modified on their surface by chemical bonding to one or more linker molecules. The ratio of linker composition to inorganic particles preferably is at least one linker molecular per inorganic particle. The linker molecules surface modify the inorganic particles, i.e., functionalize the inorganic particles. While the linker molecules bond to the inorganic particles, they are not necessarily bonded to the inorganic particles prior to bonding to the polymers. They can be bonded first to the polymers and only then bonded to the particles. Alternatively, they can bond to the two species simultaneously.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

This invention comprises a method for encapsulating nanoparticles with an encapsulating matrix that minimizes aggregation and maintains favorable properties of the nanoparticles. The matrix comprises silicon-based network-forming compounds such as ormosils and polysiloxanes. The nanoparticles are synthesized from precursors directly within the silicon-based matrix.

Encapsulation of highly-concentrated yet well-dispersed, nanometer-sized particles (nanoclusters, nanoparticles, or nanocrystals) is part of many nanotechnology applications. Nanocluster aggregation during curing in a reactive polymer matrix can be avoided when there is a high degree of chemical compatibility between the nanoclusters and the polymeric matrix. Such aggregation can be particularly detrimental in optical applications, where interparticle interaction is usually accompanied by a loss of luminescent properties. The difficulties of encapsulating nanoclusters using commercially available optical-grade epoxies are well known to those in the art. In general, these polymeric systems were designed to simultaneously optimize specific physical, thermal, and optical properties; the incorporation of significant amounts of non-reactive components (e.g. nanoclusters) or the alteration of the chemical formulation of the polymer may comprise the intended properties. An optical-quality encapsulant that is chemically compatible with a variety of chemically different nanoclusters while maintaining its original optical properties would be of great value. Embodiments of this invention address that need.

Figure 1:
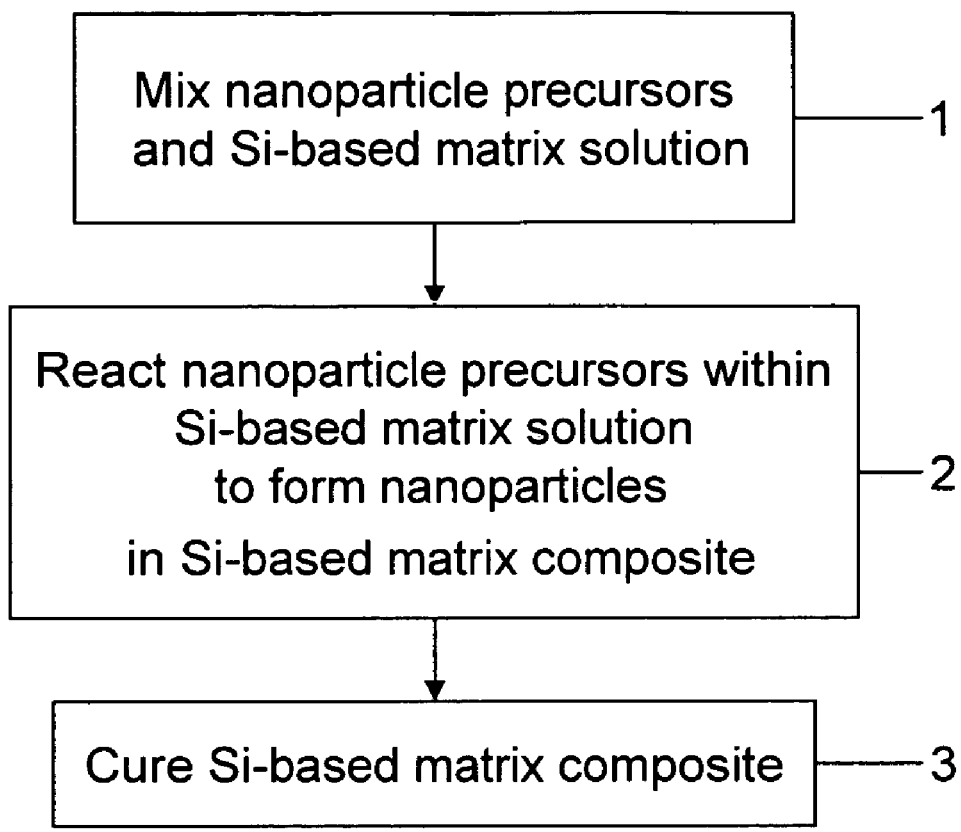
FIG. 1 illustrates an embodiment of the method of this invention.

In embodiments of this invention, Si-based network-forming materials such as ormosils and polysiloxanes serve as both the growth medium for the nanoclusters and as the organic stabilizer for the grown nanoparticles, as well as serving as the encapsulation medium for the nanoparticles. In contradistinction to other approaches, nanoparticles are not added to the encapsulating medium but are synthesized directly within the medium by adding suitable precursor chemical species that react while in the medium to generate the nanoparticles. The nanoparticle precursors do not have the same chemical formula as the final nanoparticles. As illustrated in FIG. 1, nanoparticle precursors are mixed with a silicon-based matrix solution 1. The nanoparticle precursors are reacted within the silicon-based matrix solution 2, leading to formation of nanoparticles; the combination of nanoparticles and the silicon-based matrix forms the silicon-based matrix composite. The composite is cured to produce a material with desired mechanical properties 3.

In some embodiments of this invention, nanoparticle precursors are combined with an ormosil precursor, an alcohol, and optionally a crosslinker additive. The combination of an ormosil precursor, optionally an alcohol, and optionally a crosslinker additive is termed an ormosil solution. The nanoparticle precursors can be an inorganic chemical compound or combination of compounds that, when mixed into the ormosil solution comprising an ormosil precursor, react so as to form nanoparticles. The nanoparticle precursors can be metal salts or organometallic compounds and can optionally be single-source molecular precursors. The nanoparticles synthesis in the ormosil solution can occur typically between 0 and 300° C. The ormosil solution combined with the nanoparticles is termed an ormosil composite. The crosslinker additive affects the mechanical properties of the ormosil composite, which can range from rubbery to glassy.

Reaction byproducts that are not desired as constituents of the final composite can be removed prior to curing of the ormosil composite. Some methods that can be used include but are not limited to alcohol addition and freezing out (lowering the solution temperature to reduce the solubility of the byproduct in the ormosil solution so as to induce byproduct precipitation), followed by a separation method such as, for example, filtration or centrifugation. Other standard methods of separation can be applied.

Figure 2:
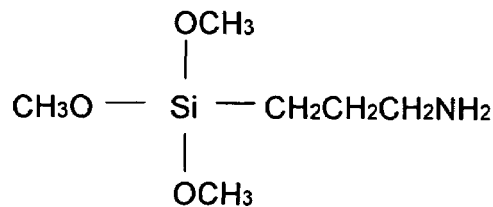
FIG. 2 illustrates some ormosil precursors for some embodiments of the invention.
Figure 2:
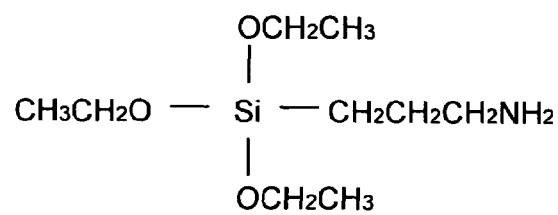
Figure 2:
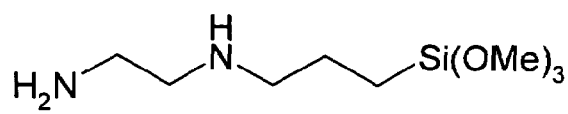
Figure 2:
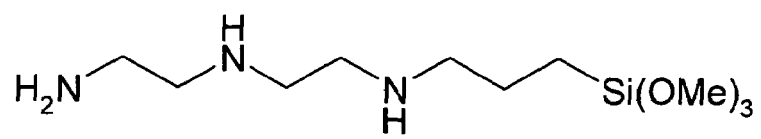

A variety of ormosils can be used in embodiments of this invention. Some examples of ormosil precursors are illustrated in FIG. 2 and include, but are not restricted to, aminopropyltrimethoxysilane (APTMS), aminopropyltriethoxysilane (APTES) [3-(2-aminoethylamino)propyl]trimethoxysilane, and 3-[2-(2-aminoethylamino)ethylamino] propyl-trimethoxysilane.

In some embodiments, curing proceeds by combining 1 part of the ormosil solution with 1-10 parts of alcohol and 0.01 to 0.5 parts water. Optionally, 0 to 1 part of additive can be included. Alcohols that are used in some embodiments of this invention include but are not restricted to ethanol and methanol. This mixture can be aged at a temperature from room temperature up to and including 100° C. prior to curing. Curing can be achieved at temperatures between 0 and 150° C. The water/alcohol mixture initiate hydrolysis and condensation of the ormosil monomers (ormosil precursors), such as, for example, (3-aminopropyl)trimethoxysilane. The water is consumed, resulting in the formation of Si—O—Si linkages and production of, in this example, methanol, which is removed by evaporation. A 3-D network Si—O—Si bonds forms; formation of an optionally clear solid is favored by allowing the curing to proceed at a relatively slow rate. Curing into a single bulk solid can be achieved by removal of some portion of the alcohol.

The shrinkage and the mechanical properties of the ormosil composite can be altered by the addition of dihydroxy- or dialkoxy-functional molecules. Shrinkage is a common characteristic of materials formed by hydrolysis and condensation reactions. When ormosil is formed from a trifunctional material of general formula $R'_{4-x}Si(RO)_x$ where x is, on average between 3 and 4, polymerization leads to a 3-dimensional Si—O—Si network. Addition of difunctional molecules such as, for example, silanol-terminated polydimethylsiloxanes, methoxy-terminated polydimethylsiloxanes, 3-(dimethoxymethyl-silyl)propylamine, 3-aminopropyl-methyl-diethoxysliane, can vary the mechanical properties of the ormosil from glassy through rubbery. These compounds are enumerated as representative examples and do not imply the limitation of embodiments of this invention to these compounds; other difunctional linker molecules can also be used. Multifunctional compounds, such as, for example, methoxymethylsiloxane-dimethylsiloxane copolymer that is 15 to 25% methoxy groups and methoxy terminated but with a branching structure, can also be employed in embodiments of the invention as crosslinker additives to control the mechanical properties of the ormosil. In embodiments of this invention, difunctional or mutifunctional additives are typically added to the ormosil solution at 1 to 10 parts by volume per 10 parts volume of trifunctional ormosil monomer. For the purpose of this invention, the term crosslinker additive includes both difunctional and multifunctiona additives as described herein.

When ormosil compounds are derived from monomers (or mixtures of monomers) such that $R'_{4-x}Si(RO)_x$ where x is, on average between 3 and 4, polymerization leads to a 3-dimensional Si—O—Si network. Variation in the value of x alters the mechanical properties of the network. For example, at a 1:1 ratio of additive to ormosil monomer, x is approximately 2.5 and the final product has a rubbery characteristic.

For one embodiment, the ormosil solution comprises 2 ml APTMS and 5 ml methanol; this is combined with 0.01 to 0.5 grams of a nanocluster precursor for elemental nanoparticles or stoichiometric amounts of nanoparticles precursors for compound nanoparticles. In some embodiments the nanoparticle precursors are first dissolved in the alcohol before combining with the ormosil precursor. Water (0.34 ml) is also added. The liquid volume is reduced by evaporation to approximately 1.5 to 2 ml and allowed to cure in an open container at room temperature to form a solid. The reduced-volume composite can be cast into a desired form prior to curing. The composite thus cast can be heat treated at temperatures between 25° C. and 125° C. to obtain the desired mechanical properties by curing.

Nanoparticles precursors for semiconductor nanoparticles can be metal salts, organometallic compounds, or single-source precursors. Some exemplary embodiments are included herein for illustrative purposes. Other source compounds can also be used as nanoparticle precursors.

In several embodiments of the preparation of CdS or CdSe in APTMS, a single-source precursor (SSP) $Li_2[Cd_{10}S_4(SPh)_{16}]$ (0.01-0.025 g) or $Li_2[Cd_{10}Se_4(SPh)_{16}]$ (0.2 g) was dissolved with stirring in 5 ml APTMS ormosil solution in an inert atmosphere environment. The mixture was allowed to react at 115° C. for approximately 18 hours, at 65° C. for 3 days, or at 25° C. for either 3 days or 7 days. Other combinations of temperature and time can be used. After cooling, the mixture was centrifuged to remove precipitated and/or suspended reaction byproducts. In other embodiments, 0.025 g of SSP was dissolved in 5 ml of APTES ormosil solution and reacted at 115° C. for approximately 18 hours. This embodiment produced luminescent nanoparticles of CdS of CdSe between 1.5 and 4.0 nanometers in diameter.

Additional single-source precursors include but are not restricted to $X_4[Y_{10}Z_4(SPh)_{16}]$, where X is selected from Li, Na, and K, Y is selected from Zn, Cd, Hg, and Fe, and Z is selected from S, Se, and Te.

In another embodiment, a metal salt was employed as the nanoparticle precursor. In this embodiment, 0.004 M solutions of S and $Cd(ClO_4)_2$ in APTMS ormosil solution were prepared and 3 ml of each were mixed together with stirring in an inert atmosphere environment. The mixture was allowed to react to 25° C. for approximately 24 hours or at 100° C. for approximately 18 hours. After cooling, the mixture was centrifuged to remove precipitated and/or suspended reaction byproducts. This embodiment produced luminescent CdS nanoparticles approximately 3.0 nanometers in diameter.

In another embodiment, an 0.004 M solution of $Cd(ClO_4)_2$ in APTMS and a 0.2 M solution of $Na_2Se$ in methanol were prepared. Three ml of the $Cd(ClO_4)_2$ was mixed with 30 microliters of the $Na_2Se$ solution and stirred in an inert atmosphere environment. The mixture was allowed to react at 25° C. for approximately 24 hours or at 100° C. for approximately 18 hours. After cooling, the mixture was centrifuged to remove precipitated and/or suspended reaction byproducts. This embodiment produced luminescent CdSe nanoparticles approximately 2 nanometers in diameter.

Additional metal salt precursors include but are not restricted to $M_yA_z$ where M is selected from Al, Si, Ti, V, Cr, Mn, Fe, Co, Ni, Cu, Zn, Ga, Ge, Y, Zr, Nb, Mo, Ru, Ph, Pd, Ag, Cd, In, Sn, Ta, W, Ir, Pt, Au, Hg, Tl, and Pb, and A is selected from hydrogen, borate, carbonate, nitrate, perchlorate, phosphate, sulfate, acetate, fluoride, chloride, bromide, and iodide. Y and Z are variable depending on the oxidation state of the metal and the charge of A. The A can represent a mixture of the above described groups and can be hydrated or unhydrated, for example, $AgBF_4$, $HAuCl_4xH_2O$, and $HAuBr_4xH_2O$.

Additional S, Se, and Te precursors may be of the form $X_2Y$ where X is selected from H, Li, Na, K, and ($NH_4$) and Y is selected from S, Se, and Te.

Organometallic precursors can also be used as the inorganic nanoparticle precursors.

In another embodiment, 0.01 to 0.5 g of hydrogen tetrachloroaurate is dissolved in 5 ml methanol and then mixed into 2 ml APTMS containing 0.34 ml water. The liquid volume is reduced by evaporation to approximately 1.5 to 2 ml and allowed to cure in an open container at room temperature to form a solid. The reduced-volume composite can be cast into a desired form prior to curing. Following curing the composite is heated at 75° C. for 12 hours. This embodiment yields a nanocomposite containing gold nanoparticles approximately 50 nanometers in diameter that is approximately 25 weight-percent gold.

In another embodiment 0.05 grams of tin acetate are dissolved in 2 ml APTMS/5 ml methanol/0.34 ml water. The liquid volume is reduced by evaporation to approximately 1.5 to 2 ml and allowed to cure in an open container at room temperature to form a solid. The reduced-volume composite can be cast into a desired form prior to curing. Following curing the composite is heated at 125° C. for 24 hours. This embodiment yields a nanocomposite containing tin nanoparticles that is approximately 1.5 weight percent in.

In embodiments of this invention, other ormosil precursors (monomers) that can be used include 3-aminopropyltriethoxysilane, [3-(2-aminoethylamino)propyl]trimethoxysilane, 3-[2,2(2-aminoethylamino-ethylamino]propyltrimethosysilane. Alcohols other than methanol or ethanol that have a boiling point lower than that of the ormosil monomer can be used. For example, with APTMS that boils at 91° C., methanol, ethanol, propanols, and butanols are among the alcohols that can be used. With APTMS that boils at 217° C., methanol, ethanol, propanols, butanols, hexanols, heptanols, septanols, and octanols are among the alcohols that can be used.

Shrinkage of the ormosil composite during curing is more likely to be of concern when forming a bulk solid rather than a thin film. In some embodiments, shrinkage can be reduced by curing the ormosil composite at room temperature for several hours, for example for 24 hours, and then further curing the ormosil composite at a temperature above room temperature, for example, for 24-48 hours at 55° C. followed by 24-48 hours at 75° C. Alternatively, curing can be achieved by ramping the temperature up over several days to the desired final cure temperature. Final cure temperatures of up to 125° C. are typical.

Shrinkage can also be reduced by partial hydrolysis of the solutions prior to use. In some embodiments, this is accomplished by aging the solutions in a sealed container at temperatures above 25° C. and below the boiling temperature of the alcohol. Typical aging times are 24 hours to 3 months; typical aging temperatures are 50-75° C.

In some embodiments of this invention, nanoparticle precursors are combined with one or more polysiloxanes. The combination of polysiloxanes and optional organic additives is termed a polysiloxane solution. The nanoparticle precursors can be a chemical compound or combination of compounds that, when mixed into the solution comprising a polysiloxane, react so as to form nanoparticles. The nanoparticle precursors for nanoparticle synthesis in polysiloxanes can be metal salts or organometallic compounds and can optionally be single-source molecular precursors. Noncarbonyl organometallic compounds do not contain only CO ligands. The nanoparticle synthesis can occur typically between 0 and 300° C. The polysiloxane solution combined with the nanoparticle is termed a polysiloxane composite.

Reaction byproducts that are not desired as constituents of the final composite can be removed prior to curing of the polysiloxane composite. Some methods that can be used include but are not limited to alcohol addition and freezing out (lowering the solution temperature to reduce the solubility of the byproduct sufficiently to induce its precipitation), followed by a separation method such as, for example, filtration or centrifugation. Other standard methods of separation can be applied.

In one embodiment, 0.025 g of either $Li_4[Cd_{10}S_4(SPh)_{16}]$ or $Li_2[Cd_{10}Se_4(SPh)_{16}]$ was dissolved or dispersed in 5 g of either 2-3 mole percent (mol %) (mercaptopropyl) methyl-siloxane-dimethylsiloxane copolymer, 4-6 mol % (mercaptopropyl)methylsiloxane-dimethylsiloxane copolymer, or 7-8 mol % (aminopropyl)methylsiloxane-dimethylsiloxane copolymer in an inert atmosphere environment. The solution/suspension was placed on a stirplate with heater blocks preheated to 100° C. The temperature was ramped to approximately 200° C. over approximately 1 hour. The solution/suspension was then heated at 200° C. for approximately 18 hours. The solution/suspension was centrifuged to remove reaction byproducts. Dilution of the silicone (polysiloxane) with a solvent such as toluene can be used to facilitate centrifugal removal of precipitated byproducts. Nanoparticle/polysiloxane composites thus synthesized are cured to solids by standard methods used for polysiloxanes.

The ormosil solution and the polysiloxane solution are examples of silicon-based matrix solutions. The ormosil composite and polysiloxane composite are examples of silicon-based matrix composites.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for in-situ formation of nanoparticles within a silicon-based matrix, comprising:
    mixing at least one noncarbonyl inorganic nanoparticle precursor, and at least one silicon-based matrix solution, thereby forming a silicon-based matrix composite comprising a plurality of nanoparticles,
    wherein the at least one noncarbonyl inorganic nanoparticle precursor comprises an anion selected from the group consisting of S, Se, Te, and combinations thereof; and
    curing the silicon-based matrix composite.

2. The method of claim 1, further comprising heating the at least one inorganic nanoparticle precursor mixed in the at least one silicon-based matrix solution at a temperature between 0° C. and 300° C.

3. The method of claim 1, wherein the step of curing is performed at a temperature between 0° C. and 150° C.

4. The method of claim 1, wherein the at least one noncarbonyl inorganic nanoparticle precursor further comprises a metal salt comprising a metal selected from the group consisting of Al, Si, Ti, V, Cr, Mn, Fe, Co, Ni, Cu, Zn, Ga, Ge, Y, Zr, Nb, Mo, Ru, Rh, Pd, Ag, Cd, In, Sn, Ta, W, Ir, Pt, Au, Hg, Tl, Pb, and combinations thereof.

5. The method of claim 1, wherein the silicon-based matrix solution comprises a polysiloxane or an ormosil precursor.

6. A method for in-situ formation of nanoparticles within a silicon-based matrix, comprising:
    mixing at least one noncarbonyl inorganic nanoparticle precursor and at least one silicon-based matrix solution, thereby forming a silicon-based matrix composite comprising a plurality of nanoparticles; and
    curing the silicon-based matrix composite, wherein the at least one noncarbonyl inorganic nanoparticle precursor is a noncarbonyl organometallic compound.

7. A method for in-situ formation of nanoparticles within a silicon-based matrix, comprising:
    mixing at least one noncarbonyl inorganic nanoparticle precursor and at least one silicon-based matrix solution, thereby forming a silicon-based matrix composite comprising a plurality of nanoparticles; and
    curing the silicon-based matrix composite, wherein the at least one noncarbonyl inorganic nanoparticle precursor is a single-source precursor of composition $X_4[Y_{10}Z_4(SPh)_{16}]$, where X is selected from the group consisting of Li, Na, and K, Y is selected from the group consisting of Zn, Cd, Hg, and Fe, and Z is selected from the group consisting of S, Se, and Te.

8. A method for in-situ formation of nanoparticles within a silicon-based matrix, comprising:
    mixing at least one inorganic nanoparticles precursor and an ormosil solution, the ormosil solution comprising an ormosil precursor, thereby forming an ormosil composite comprising a plurality of nanoparticles; and
    curing the ormosil composite after reacting the at least one inorganic nanoparticle precursor to form the plurality of nanoparticles.

9. The method of claim 8, further comprising heating the at least one inorganic nanoparticle precursor mixed in the ormosil solution at a temperature between 0° C. and 300° C.

10. The method of claim 8, wherein the step of curing is performed at a temperature between 0° C. and 150° C.

11. The method of claim 8, wherein the at least one inorganic nanoparticle precursor comprises a metal salt.

12. The method of claim 11, wherein the metal salt comprises a metal selected from the group consisting of Al, Si, Ti, V, Cr, Mn, Fe, Co, Ni, cu, Zn, Ga, Ge, Y, Zr, Nb, Mo, Ru, Rh, Pd, Ag, Cd, In, Sn, Ta, W, Ir, Pt, Au, Hg, Tl, Pb, and combinations thereof.

13. The method of claim 8, wherein the at least one inorganic nanoparticle precursor comprises an anion selected from the group consisting of S, Se, Te, and combinations thereof.

14. The method of claim 8, wherein the at least one inorganic nanoparticle precursor is an organometallic compound.

15. The method of claim 8, wherein the at least one inorganic nanoparticle precursor is a single-source precursor of composition $X_4[Y_{10}Z_4(SPh)_{16}]$, where X is selected from the group consisting of Li, NA, and K, Y is selected from the group consisting of Zn, Cd, Hg, and Fe, and Z is selected from the group consisting of S, Se, and Te.

16. The method of claim 8, wherein the at least one inorganic nanoparticle precursor is selected from the group consisting of $Li_4[Cd_{10}S_4(SPh)_{16}]$ and $Li_4[Cd_{10}Se_4(SPh)_{16}]$.

17. The method of claim 8, wherein the ormosil precursor is selected from the group consisting of aminopropyltrimethoxysilane, aminopropyltriethoxysilane, [3-(2-aminoethylamino)propyl]trimethoxysilane, and 3-[2-(2-aminoethylamino)ethylamino]propyl-trimethoxysilane.

18. The method of claim 8, wherein the ormosil solution further comprises a crosslinker additive.

19. The method of claim 8, wherein the ormosil solution further comprises a crosslinker additive selected from the group consisting of silanol-terminated polydimethylsiloxanes, methoxy-terminate polydimethylsiloxanes, 3-(diethoxymethyl-silyl)propylamine, 3-aminopropyl-methyl-diethoxysilane, and methoxymethylsiloxane-dimethysiloxane copolymer.

20. A method for in-situ formation of nanoparticles within a silicon-based matrix, comprising: mixing at least one noncarbonyl inorganic nanoparticle precursor and a polysiloxane solution, thereby forming a polysiloxane composite comprising a plurality of nanoparticles; and curing the polysiloxane composite after reacting the at least one inorganic nanoparticle precursor to form the plurality of nanoparticles, wherein the at least one inorganic nanoparticle precursor is a noncarbonyl organometallic compound.

21. A method for in-situ formation of nanoparticles within a silicon-based matrix, comprising:

mixing at least one noncarbonyl inorganic nanoparticle precursor and a polysiloxane solution, thereby forming a polysiloxane composite comprising a plurality of nanoparticles; and curing the polysiloxane composite after reacting the at least one inorganic nanoparticle precursor to form the plurality of nanoparticles, wherein the at least one inorganic nanoparticle precursor is a single-source precursor of composition $X_4[Y_{10}Z_4(SPh)_{16}]$, where X is selected from the group consisting of Li, Na, and K, Y is selected from the group consisting of Zn, Cd, Hg, and Fe, and Z is selected from the group consisting of S, Se, and Te.

* * * * *